US010182269B1

(12) United States Patent
Samant et al.

(10) Patent No.: US 10,182,269 B1
(45) Date of Patent: Jan. 15, 2019

(54) HTTP LIVE STREAMING DELIVERY OVER MULTICAST

(71) Applicant: Verizon Patent and Licensing Inc., Arlington, VA (US)

(72) Inventors: Niranjan R. Samant, Lansdale, PA (US); Suri B. Medapati, San Jose, CA (US); James F. Di Mattia, Easton, PA (US); Kishore Tallapaneni, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/961,067

(22) Filed: Apr. 24, 2018

(51) Int. Cl.
| | |
|---|---|
| *H04N 21/6405* | (2011.01) |
| *H04N 21/2187* | (2011.01) |
| *H04N 21/2343* | (2011.01) |
| *H04N 21/235* | (2011.01) |
| *H04N 21/647* | (2011.01) |
| *H04N 21/231* | (2011.01) |
| *H04N 21/222* | (2011.01) |
| *H04N 21/239* | (2011.01) |
| *H04N 21/434* | (2011.01) |
| *H04N 21/2381* | (2011.01) |

(52) U.S. Cl.
CPC ..... *H04N 21/6405* (2013.01); *H04N 21/2187* (2013.01); *H04N 21/2221* (2013.01); *H04N 21/2353* (2013.01); *H04N 21/2381* (2013.01); *H04N 21/2393* (2013.01); *H04N 21/23106* (2013.01); *H04N 21/23439* (2013.01); *H04N 21/4343* (2013.01); *H04N 21/6473* (2013.01)

(58) Field of Classification Search
CPC .......... H04N 21/6405; H04N 21/2187; H04N 21/2221; H04N 21/23106; H04N 21/23439; H04N 21/2353; H04N 21/2381; H04N 21/2393; H04N 21/4343; H04N 21/6473
See application file for complete search history.

(56) References Cited

U.S. PATENT DOCUMENTS

| | | | |
|---|---|---|---|
| 9,414,095 B1 * | 8/2016 | Corda | H04L 63/0428 |
| 2012/0317605 A1 * | 12/2012 | Brogan | H04N 21/64707 725/109 |
| 2013/0132986 A1 * | 5/2013 | Mack | H04L 65/605 725/14 |
| 2014/0013376 A1 * | 1/2014 | Xu | H04N 21/25 725/116 |

(Continued)

*Primary Examiner* — Alexander Q Huerta

(57) ABSTRACT

A system receives one or more content streams for a program including a Hypertext Transfer Protocol (HTTP) Live Streaming (HLS) master manifest file for the program, HLS media segments having different bitrate variants, and HLS media manifest files for each of the different bitrate variants. The system encapsulates the HLS master manifest file, the HLS media segments, and the HLS media manifest files into Internet Protocol/User Datagram Protocol (IP/UDP) packets and sends the IP/UDP packets via multicast to video serving offices. Network devices in the video serving offices extract from the IP/UDP packets the HLS master manifest file, the HLS media segments, and the HLS media manifest files. The network devices send to a cache device the HLS media segments and the HLS media manifest files; and forward the IP/UDP packets via multicast to devices in customer premises.

20 Claims, 10 Drawing Sheets

(56) References Cited

U.S. PATENT DOCUMENTS

| | | | |
|---|---|---|---|
| 2014/0281010 A1* | 9/2014 | Panje | H04L 65/60 709/231 |
| 2014/0351386 A1* | 11/2014 | McHugh | H04N 21/23439 709/219 |
| 2015/0288617 A1* | 10/2015 | Dasher | H04L 47/801 709/226 |
| 2015/0312646 A1* | 10/2015 | Dhanabalan | H04N 21/8106 725/32 |
| 2015/0365450 A1* | 12/2015 | Gaunt | H04L 65/4084 709/231 |
| 2015/0381690 A1* | 12/2015 | Schmidt | H04L 65/4069 709/231 |
| 2016/0127440 A1* | 5/2016 | Gordon | H04N 21/23439 709/219 |
| 2016/0205164 A1* | 7/2016 | Schmidt | H04L 1/0001 709/219 |
| 2016/0212496 A1* | 7/2016 | Lau | H04N 21/6125 |
| 2016/0269801 A1* | 9/2016 | Harden | H04N 21/6373 |
| 2017/0127147 A1* | 5/2017 | Crabtree | H04N 21/23439 |
| 2017/0171610 A1* | 6/2017 | Nair | H04N 21/2362 |
| 2017/0353516 A1* | 12/2017 | Gordon | H04N 21/8456 |
| 2017/0359628 A1* | 12/2017 | Sachdev | H04N 21/812 |
| 2018/0027039 A1* | 1/2018 | Moorthy | H04L 65/4069 |
| 2018/0103199 A1* | 4/2018 | Hendry | H04N 21/2343 |

* cited by examiner

US 10,182,269 B1

HTTP LIVE STREAMING DELIVERY OVER MULTICAST

BACKGROUND

Adaptive bitrate streaming (ABS) is a technique used for both live and on-demand (e.g., video-on-demand (VOD)) content streaming. ABS encodes an item of content (e.g., a video file) into multiple desired bitrate streams, and segments each bitrate stream into a sequence of small chunks or segments (e.g., of seconds in length). A file, called a manifest file or playlist file, is used to specify information of available streams and variant bitrates for the item of streaming content, and also specifies the Hypertext Transfer Protocol (HTTP) locations of the chunks or segments of the item of streaming content.

One example of an ABS protocol is HTTP Live Streaming (HLS). HLS is used extensively to deliver live video streams via unicast to a multitude of client devices over Internet Protocol (IP) networks. HLS encapsulates video, audio, closed-captions, trick-play streams, and metadata associated with a video channel into media containers that typically are delivered to client devices over HTTP unicast. These HLS streams are made available to client devices at an origin server or a cache server such that the HLS streams are entirely replicated for every client device consuming the same video stream on the same network.

DETAILED DESCRIPTION OF PREFERRED EMBODIMENTS

Figure 1A:
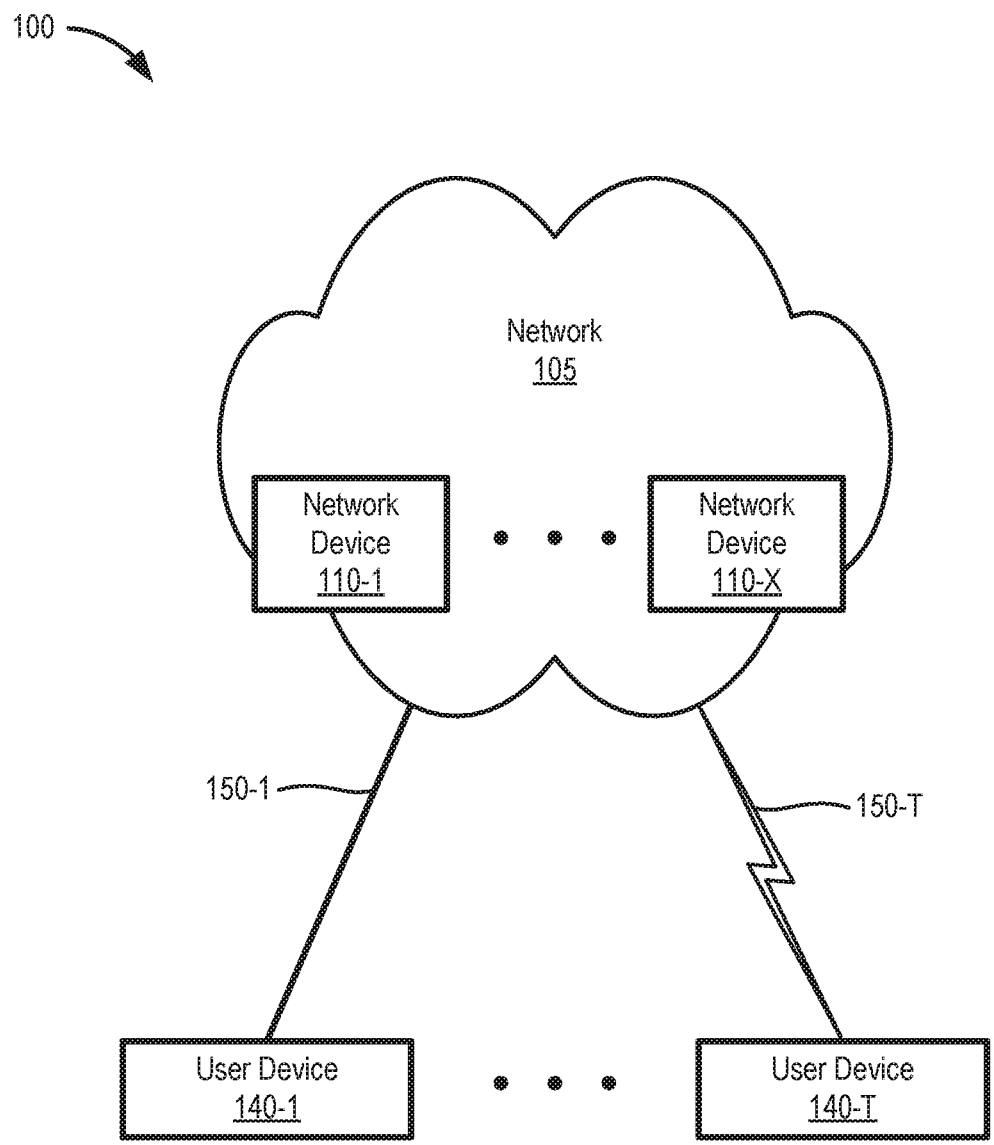
FIG. 1A is a diagram illustrating an exemplary environment in which exemplary embodiments of a multicast HTTP Live Streaming (HLS) service may be implemented.

The following detailed description refers to the accompanying drawings. The same reference numbers in different drawings may identify the same or similar elements. Also, the following detailed description does not limit the invention.

The delivery of high quality, secure, live television service over Internet Protocol (IP) networks requires television service providers and other types of service provider (e.g., a mobile service provider, an Internet service provider, etc.) to effectively and consistently manage bandwidth, resiliency, and encryption across multiple live channels and across a wide spectrum of client devices. This delivery requires a carefully orchestrated sequence of events to precisely process, encode, encrypt, store, and deliver live/linear streams. End-to-end, these streams may have to traverse IP/Multiprotocol Label Switching (IP/MPLS) networks, reconfigurable optical add/drop multiplexers (ROADMs), content delivery networks (CDNs), and/or access networks (such as passive optical networks (PONs)), collectively referred to herein as a "managed video access network."

HLS is a HTTP-based adaptive bitrate streaming (ABS) protocol that involves breaking the media stream into a sequence of file downloads. Each file may be downloaded as one portion of a transport stream. Each downloaded file may be played in sequence to present a continuous media stream. As a given stream is played, a media-playing client may choose from multiple different alternative streams containing the same content encoded at various data rates. At the beginning of a streaming session, the media playing client downloads a playlist file that specifies the different or alternate streams that are available. In HLS, a given multimedia presentation is specified by a Uniform Resource Identifier (URI) to the playlist file, which itself consists of an ordered list of media URIs and informational tags. Each media URI refers to a media file that is a segment of a single continuous media stream. To play a stream, the media-playing client first obtains the playlist file, and then obtains and plays each media file in the playlist in sequence. In HLS, the playlist is organized as set forth, for example, in Internet Engineering Task Force (IETF) Request for Comments (RFC) 8216, "HTTP Live Streaming." Conventional HLS delivery for live television streaming is particularly bandwidth intensive for managed video access networks, requiring simultaneous delivery of separate HLS streams via HTTP unicast delivery to each client device.

According to implementations described herein, a video architecture is provided that encapsulates HLS containers into IP/User Datagram Protocol (UDP) for multicast delivery over IP/MPLS networks, ROADMs, and PON networks to client devices. Also described herein is a hand-off of multicast to unicast at a CDN origin or a network edge for over-the-top (OTT) delivery to mobile client devices outside the home or outside the managed video access network. A handoff from multicast to unicast at the CDN origin or edge may also be used to provide HLS streams to user devices that may have unrecoverable packet losses using multicast delivery. For example, a user device may request missing multicast segments or manifests via unicast. The handoff from multicast to unicast at the CDN origin or edge may also be used to provide enhanced services such as live rewind features (e.g., "LookBack TV") and/or restarting programs in progress ("StartOver TV"). Carrying HLS over IP/UDP multicast (referred to herein as "HLS multicast") results in significant benefits to service providers in terms of bandwith savings by carrying one copy of a video stream to thousands or millions of devices, instead of replicating and distributing the video stream separately to each client device. The savings may allow service providers to offer a higher number of live video services.

Systems and methods described herein utilize the benefits of both ABS and multicast delivery. Each video channel stream is encoded once and multiple bitrate variants are created. The variants are all encapsulated into one multicast stream and delivered as a single bundle to one or more devices in customer premises (e.g., the home or wherever connected to the managed video access network). Once in the home, the different HLS multicast streams can be consumed by a media-playing client on the devices, such as set top boxes, tablets, and smart phones. The highest bitrates (e.g., of the multiple bitrate variants) may be delivered to the devices with the largest screens (e.g., televisions) and the lower bitrates are delivered to devices with smaller screens (e.g., smart phones).

FIG. 1A is a diagram illustrating an exemplary environment 100 in which exemplary embodiments may be implemented. As illustrated, environment 100 includes a managed video access network 105. Network 105 includes network devices 110-1 through 110-X, in which X>1 (also referred to collectively as network devices 110 or individually as network device 110). Environment 100 also includes user devices 140-1 through 140-T, in which T>1 (also referred to collectively as user devices 140 or individually as user device 140). As further illustrated, environment 100 includes communication links 150-1 through 150-T, (also referred to collectively as links 150 and, individually and generally as link 150).

The number of network devices, the number of user devices, the number of networks, and the arrangement in environment 100 are exemplary. According to other embodiments, environment 100 may include additional network devices, fewer network devices, and/or differently-arranged network devices, than those illustrated in FIG. 1A. Additionally, or alternatively, environment 100 may include additional networks, fewer networks, and/or arrangement that is/are different from that illustrated in FIG. 1A. For example, user device 140 may be a device of a local area network (LAN). Additionally, the number of links 150, the type of links 150 (e.g., wired, wireless, etc.), and the arrangement of links 150 illustrated in environment 100 are exemplary. For example, although not illustrated, links 150 exist between network devices 110 included in network 105.

A network device may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, and/or a cloud device).

A communication connection between network devices 110 and between user device 140 and network device 110 may be direct or indirect via link 150. For example, an indirect communication connection may involve an intermediary network device, another user device, and/or an intermediary network not illustrated in FIG. 1A. A device may be implemented according to a centralized computing architecture, a distributed computing architecture, or a cloud computing architecture. Additionally, a device may be implemented according to one or multiple network architectures (e.g., a client device, a server device, a peer device, a proxy device, and/or a cloud device).

Network 105 includes a managed video access network that provides an HLS multicast service to users. For example, network 105 includes a program repository that obtains/stores programs and a managed video access network to service live HLS requests. The HLS multicast service may include multicast capabilities and adaptive bit rate streaming capabilities, as described herein.

Network 105 includes one or multiple networks of one or multiple types. Network 105 may be implemented as a satellite-based network, a terrestrial-based network, or a combination thereof. Network 105 may be implemented to include a television distribution network, a mobile network, a program streaming network, or other suitable network (e.g., the Internet, etc.) for providing programs. Network 105 may be implemented to multicast programs using various technologies, such as an optical architecture, a coaxial cable architecture, an Internet Protocol (IP) TV architecture, a digital subscriber line (DSL) architecture, a wireless architecture, an Internet-based architecture, a program streaming architecture, or some combination thereof. Depending on the architecture implemented, network 105 may include super headend (SHE) devices, video hub office (VHO) devices, and video serving office (VSO) devices. Network 105 may include other types of devices, such as, for example, billing devices, security devices, customer profile devices, interactive programming guide devices, load balancer devices, and various types of program distribution devices (e.g., routers, gateway devices, repeater devices, splitter devices, multiplexers (e.g., ROADMs), PON devices, etc.).

Network devices 110 include network devices that are capable of performing processes, as described herein. For example, a portion of network devices 110 is capable of delivering programs to users via user devices 140. For example, this portion of network devices 110 may be implemented to deliver programs using various technologies, such as an optical architecture, a coaxial cable architecture, an Internet Protocol (IP) TV architecture, a digital subscriber line (DSL) architecture, a wireless architecture, and/or an Internet-based architecture. Depending on the architecture implemented, this portion of network devices 110 may include various types of program distribution devices, program storage devices, and other types of devices that contribute to the HLS multicast service, such as, billing devices, security devices, customer profile devices, and application server devices. By way of further example, this portion of network devices 110 may include SHE devices, VHO devices, VSO devices, routers, gateway devices, multiplexers, program server devices, interactive programming guide devices, load balancer devices, optical network termination devices, switching devices, splitter devices, PON devices, web servers, multicast servers, etc.

According to an exemplary embodiment, this portion of network devices 110 delivers programs using HLS protocols over multicast. For example, upstream in the managed video access network, a video stream is encoded and packaged with HLS protocols (e.g., manifest files and media segments) for each video channel with all its variant profiles (e.g., bitrate variants, etc.). The HLS manifest files and the media segments may be encapsulated for all media variants into IP/UDP packets, creating a single multicast stream that can be delivered over a public IP/MPLS network with Global Table Multicast (GTM) activated, across a multicast enabled ROADM, and across a PON, directly to user devices 140 (e.g., subscriber set top boxes, smart televisions, tablets, and smart phones).

User device 140 includes a device that interfaces directly or indirectly with network 105 and presents a program to the user for consumption. For example, user device 140 may include a display device (e.g., a television, a smart television, a monitor), a set top box (e.g., a client device, a thin client device, a converter box, a receiver, a tuner, a digibox, an Internet Protocol Television (IPTV) set top box), a server device (e.g., a media server that includes tuners) that services one or multiple set top boxes, a mobile device (e.g., a smartphone, a tablet device, a netbook, etc.), a gaming system, a computer (e.g., a desktop computer, a laptop computer, etc.), or other type of end user device (e.g., an Internet access device, etc.). According to an exemplary embodiment, user device 140 includes a media-playing client. The media-playing client performs functions as described herein, such as selecting a bitrate for a live program received via HLS multicast.

Figure 1B:
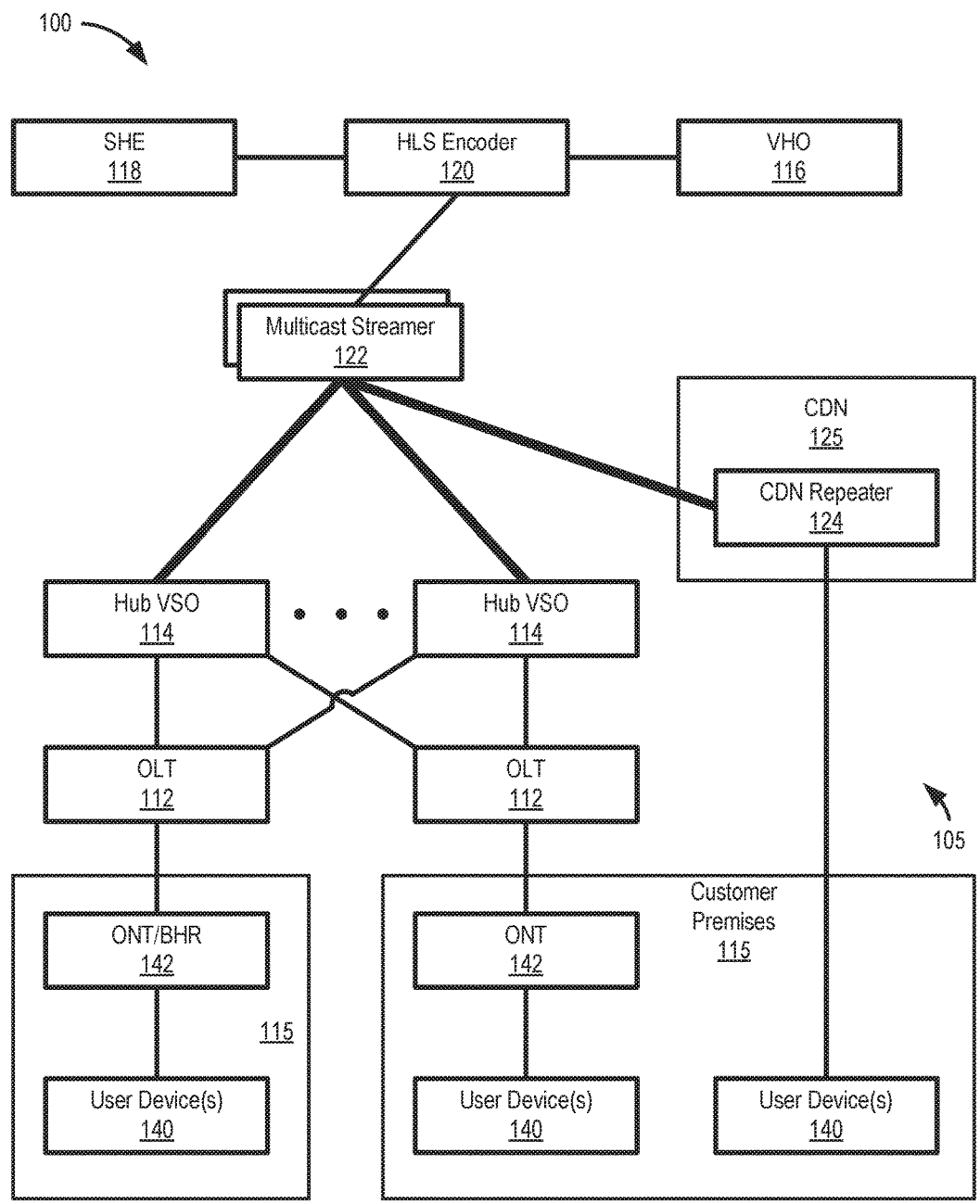
FIG. 1B is a diagram illustrating exemplary arrangement of network elements that provide the multicast HLS service, according to an implementation.

FIG. 1B is a diagram illustrating exemplary implementations of managed video access network 105 and customer premises 115 in environment 100. For example, a portion of network 105 is capable of delivering programs to users via user devices 140. For purposes of description, assume that network 105 is implemented to include an optical network with multicast capabilities. According to such an implementation, network 105 may include optical line terminals (OLT) 112, hub video serving offices (VSO) 114, a video headend office (VHO) 116, a super headend (SHE) 118, an HLS encoder 120, a multicast streamer 122, and a CDN repeater 124 within a CDN 125. Each of OLT 112, VSO 114, VHO 116, SHE 118, HLS encoder 120, multicast streamer 122, and CDN repeater 124 may correspond to or include network elements corresponding to network devices 110.

OLT 112 may serve as the program service provider's endpoint. OLT 112 may provide downstream and upstream frame processing and other functions, such as traffic scheduling, buffer controlling, and bandwidth allocating.

Hub VSO 114 distributes programs to devices in customer premises 115 (e.g., optical network terminals (ONT)/broadband home router (BHR) 142 and/or user devices 140) via access networks. Hub VSO 114 may include network elements to distribute programs to customer premises 115 within a respective VSO zone. A VSO zone may represent a particular geographical or broadcast area serviced by a hub VSO 114. As described further in connection with FIG. 1C, VSO 114 may include equipment to facilitate delivery of video content to ONT/BHRs 142 and user devices 140.

Figure 1C:
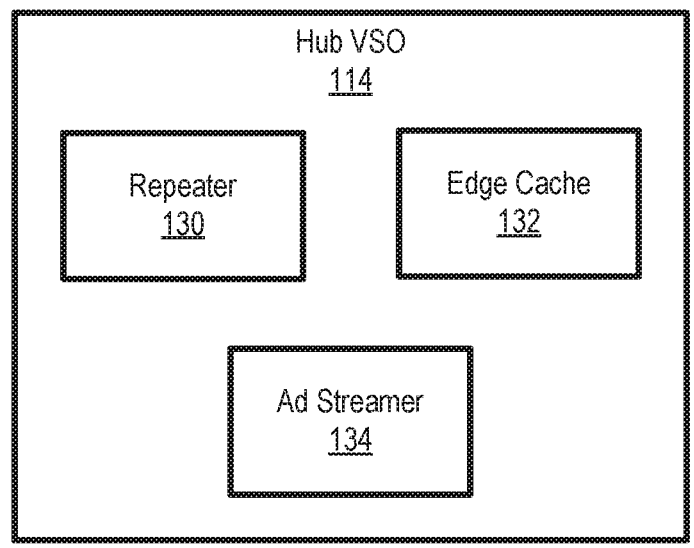
FIG. 1C is a diagram illustrating an exemplary configuration of a hub video serving office (VSO) of FIG. 1B.

Referring to FIG. 1C, hub VSO 114 may include a repeater 130, an edge cache 132, and an ad streamer 134. Repeater 130 may receive HLS multicast program segments (e.g., from multicast streamer 122) and perform forward error correction (e.g., to recover missing segments, corrupted segments, etc.). Repeater 130 may forward the live content to OLTs 112 using multicast and write to a local edge cache 132. Edge cache 132 may store HLS program segments and corresponding manifests (e.g., for a designated period of minutes or hours). Ad streamer 134 may store and insert advertisements at designated advertising breaks in a linear program stream. Ad streamer 134 may, for example, provide advertisements for insertion by repeater 130 or for delivery to user devices 140 for insertion. In some implementations, VSO 114 may include additional network elements, such as a switches and routers. For example, VSO 114 may include a least cost router (LCR) to facilitate delivery of programs to/from repeater 130 and an internet access router (IAR) to facilitate communications between repeater 130, edge cache 132, and ad streamer 134.

Referring again to FIG. 1B, VHO 116 includes network elements that ingest programs on a regional level and a local level. VHO 116 may also provide on-demand services, etc. SHE 118 includes network elements that ingest programs on a national level. SHE 118 may aggregate, process, encode, and distribute programs nationally or via VHOs 116.

VHO 116, VSO 114, and/or SHE 118 may also include storage devices that store user interfaces (e.g., interactive programming guides (IPGs), main menu, sub-menus, etc.) and programs pertaining to the program service. The managed video access network may also include network elements not specifically illustrated, such as switches, amplifiers, add/drop multiplexers, routers, other types of intermediary network elements, etc. For example, VSO 114 may include gateway routers (GWRs), etc.

An exemplary implementation of network devices 110 in managed video access network 105 may also include an HLS encoder 120 and a streamer 122. HLS encoder 120 may encode and package each video stream with all its variant profiles (e.g., different bitrates, etc.) as media segments and manifest files. According to an exemplary implementation, HLS encoder 120 includes logic that generates HLS media segments of a program, such as the actual audio/video streams, chunked or divided into playable segments (e.g., HLS segments). For example, the HLS media segments may include files having multiple adaptive bitrates of the program. According to an exemplary implementation, HLS encoder 120 includes logic that generates an HLS master manifest and HLS media manifest files for the program HLS encoder 120 and may be implemented as a network computer.

Streamer 122 may receive and encapsulate the HLS manifest files and the media segments for all media variants into IP/UDP packets creating a single multicast stream. For example, streamer 122 may include logic that places packets from HLS encoder 120 (e.g., the segments, manifest files, and headers) in protocol packets that are suitable for multicast transmission. According to an exemplary implementation, the protocol packets are UDP packets. The streaming device also includes logic that generates multicast headers (e.g., UDP headers) for the protocol packets (e.g., UDP packets). Streamer 122 includes logic that streams UDP packets, which include the media segments and manifest files for each bitrate variant, towards user devices 140. Streamer 122 may be implemented as a network computer, a web server, an application server, a streaming server, an origin server, a media server, a video server, or other type of streaming server device.

CDN repeater 124 may be included within CDN network 125. CDN network 125 may include, for example, network devices (e.g., network devices 110) to provide unicast delivery and/or OTT delivery of content (e.g., on-demand content) to users. CDN repeater 124 may receive HLS multicast program segments (e.g., from streamer 122) and may perform error correction (e.g., to recover missing segments, corrupted segments, etc.). CDN repeater 124 may forward the program segments to a cache location in CDN for support of on-demand (in contrast with live HLS content) via unicast delivery.

As further illustrated in FIG. 1B and described above, environment 100 may include user devices 140 and ONT/BHRs 142. For example, these end user elements may be implemented as customer premise devices in customer premises 115. ONT/BHR 142 may connect user device 140 to managed video access network 105. In some implementation, ONT/BHR 142 may be configured to function as a switch and/or router for the devices in customer premises 115. Furthermore, ONT/BHR 142 may function as a wireless access point (e.g., WiFi access point) for devices in customer premises 115. In another implementation, some features of ONT/BHR 142 may be incorporated in separate devices. ONT/BHR 142 may connect to network 105 via an optical fiber and may function as a gateway device to a PON located in network 105.

According to other exemplary embodiments, the HLS multicast service of environment 100 may include additional, fewer, and/or different network elements than those illustrated in FIGS. 1A-1C and described herein. Additionally, or alternatively, multiple network elements may be combined into a single network element. For example, HLS encoder 120 and streamer 122 may be combined into a single network element. Additionally, or alternatively, a single network element may be implemented as multiple network elements in which a process or a function may be collaboratively performed or multiple processes or functions may be split between them. For example, HLS encoder 120 may be implemented as multiple network elements, such as, for example, a segmenter that divides a program into segments or chunks, and a program presenter that generates a playlist or manifest.

Figure 2A:
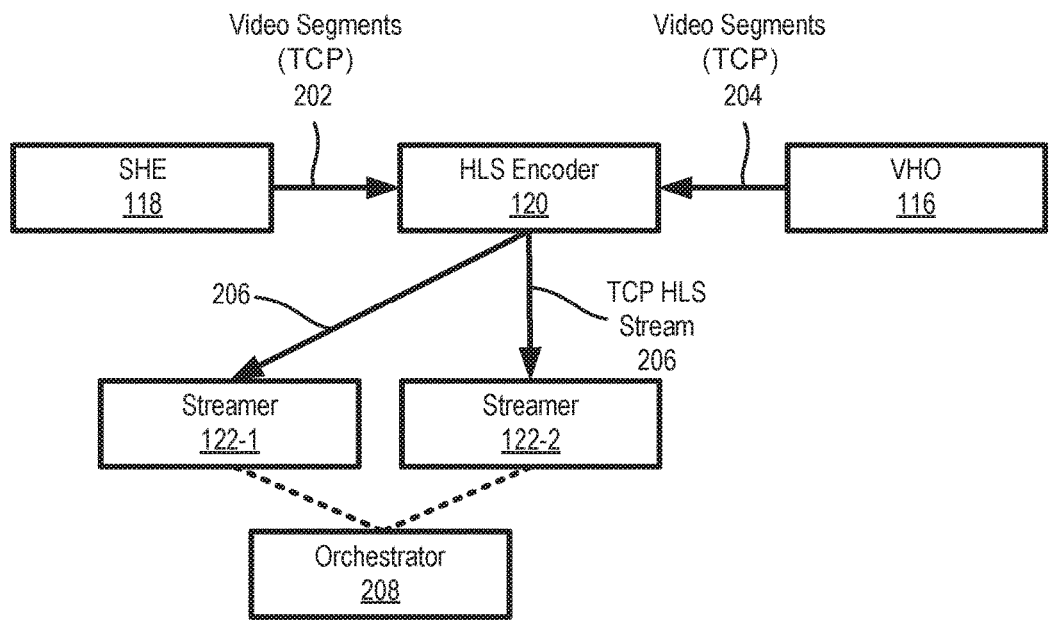
FIGS. 2A-2C are diagrams that illustrate exemplary communications pertaining to the multicast HLS service.
Figure 2B:
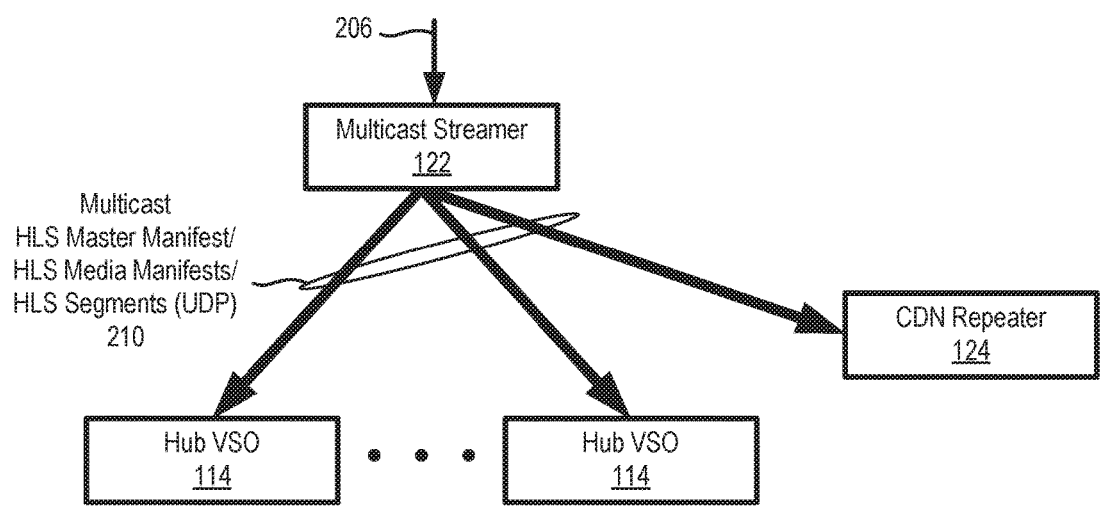
Figure 2C:
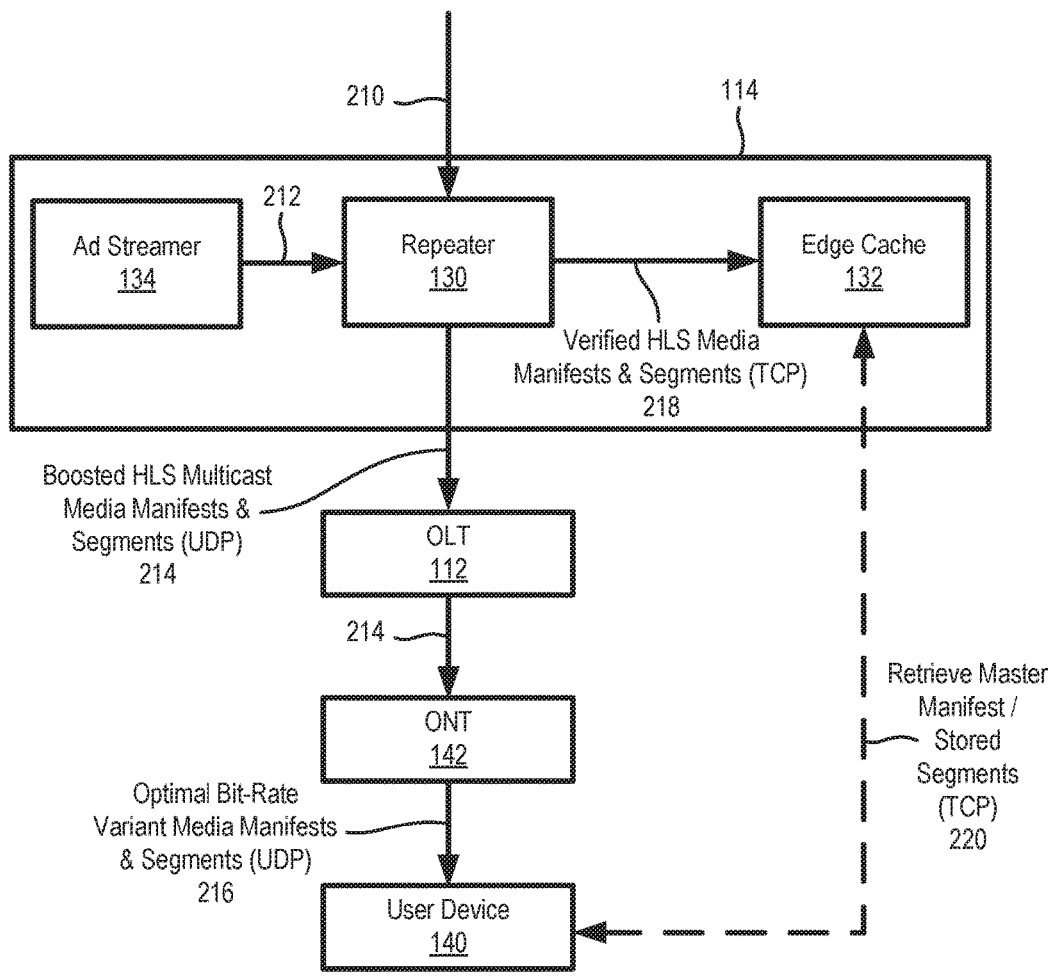

FIG. 2A-2C are diagrams that illustrate exemplary communications in portions of network environment 100 pertaining to the HLS multicast service. As shown in FIG. 2A, SHE 118 may receive a programming stream (e.g., for national live distribution), such as MPEG2 file stream or another video compression format. SHE 118 may divide the video into segments for streaming and provide video segments 202 via Transmission Control Protocol (TCP) to HLS encoder 120. Alternatively, VHO 116 may receive a regional programming video (e.g., a local television channel). Similar to SHE 118, VHO 116 may divide the regional programming video into segments for streaming and provide video segments 204 via TCP to HLS encoder 120.

HLS encoder 120 may receive video segments 202 and/or video segments 204. HLS encoder 120 may encode and package different bitrate streams (e.g., high resolution, medium, resolution, low resolution, etc.) from the original video segments 202/204. HLS encoder 120 may generate a master manifest file that identifies the different bitrate streams and media manifest files that identify video segments for a specific bitrate variant. The master manifest may map to different media manifest files for each bitrate stream. The master manifest file may be updated infrequently (e.g., at intervals of several minutes or more), while the media manifest files are updated continually (e.g., every few seconds) during streaming to reflect the new segments being added to the live stream at each bitrate variant. HLS encoder 120 may provide the HLS master manifest, the HLS media manifests, and the HLS segments via one or more TCP streams, referred to collectively as TCP HLS stream 206, to one or more streamers 122. According to one implementation, the HLS master manifest, the HLS media manifests, and/or the HLS segments in TCP HLS stream 206 may be encrypted using one or more digital rights management (DRM) techniques. Alternatively, TCP HLS stream 206 may be left unencrypted as permitted by the content provider rights.

According to one implementation, as shown in FIG. 2A, two streamers 122-1 and 122-2 may each receive TCP HLS stream 206 for resiliency/redundancy. An orchestrator 208 (e.g., resident with or separate from streamers 122) may monitor both streamers 122 and assign one streamer 122 as active and the other streamer 122 as a backup. Only one of streamers 122-1 or 122-2 may perform the task of multicasting downstream at one time. If the assigned active streamer 122 does not report back to orchestrator 208 within a predefined timeout period, the backup streamer 122 takes over and performs the multicast send. The active streamer 122 may stream the multicasts to repeater devices (described below) at various locations. Streamers 122 may maintain a cache of segments for specific Time-To-Live (TTL) periods in order to support error recovery for the downstream multicast repeaters.

Referring to FIG. 2B, when the active streamer 122 receive TCP HLS stream 206, streamer 122 may encapsulate the HLS master manifest file, the HLS media manifest files, and the media segments for all bitrate variants into IP/UDP packets, creating a single multicast stream 210 of the program content from either SHE 118 or VHO 116. Generally, multicast stream 210 may be delivered over a public IP/MPLS network with Global Transport Multicast (GTM) activated, across a multicast enabled ROADM, and across a Passive Optical Network (PON) directly to ONT/BHRs 142 and user devices 140 at customer premises 115. Thus, each program with its variant resolution profiles is contained in a single IP/UDP multicast stream.

Figure 3:
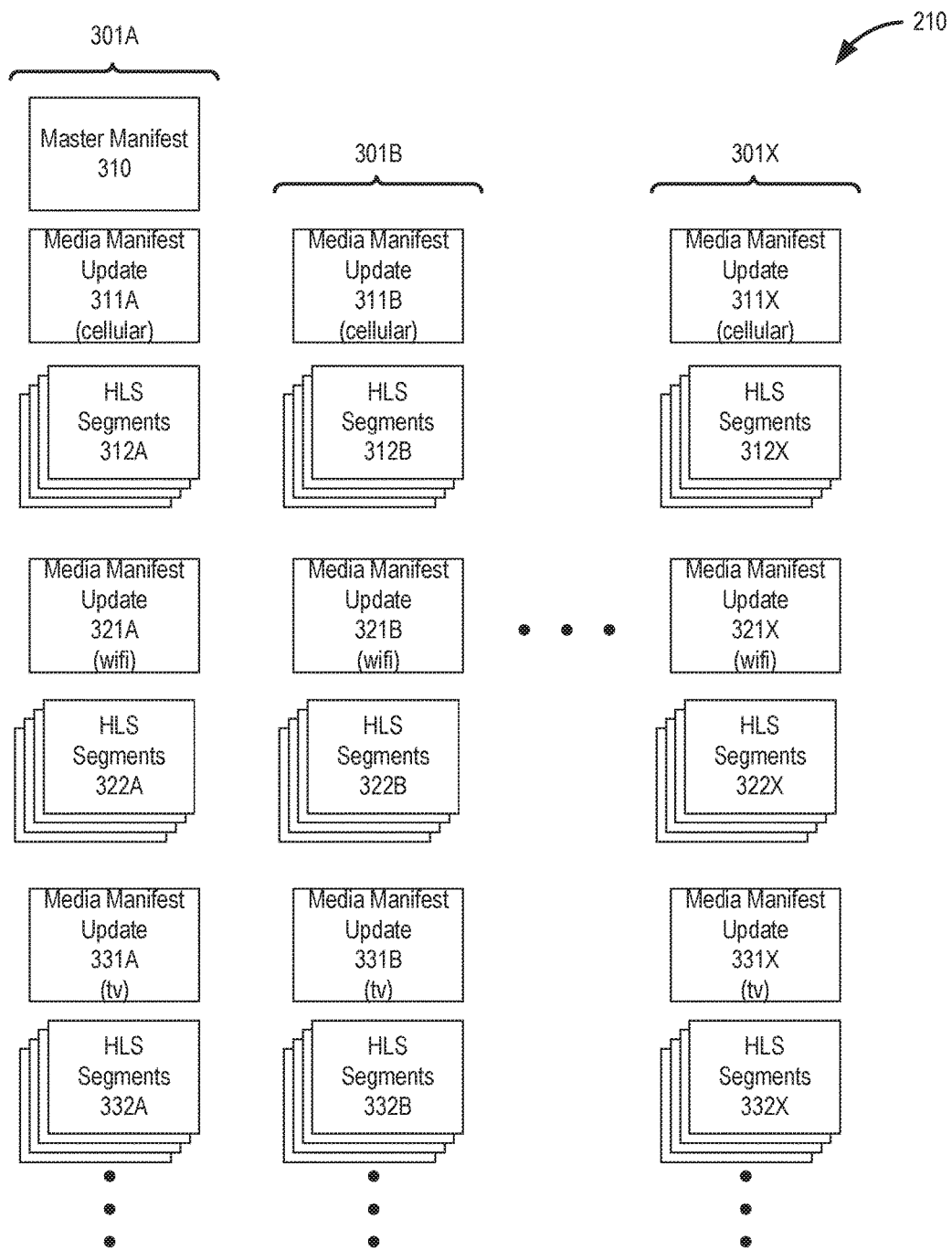
FIG. 3 is a schematic illustrating a multicast HLS stream.

FIG. 3 provides a simplified schematic of multicast stream 210. As shown in FIG. 3, sequences 301A through 301X of packets may be forwarded via IP/UDP multicast. In the example of FIG. 3, assume three different resolution variants (i.e., low, medium, and high) are supported for a particular program. Sequence 301A may include master manifest 310, which is the top-level text-based file that identifies URIs for the different resolution variants of the program. In another implementation, master manifest 310 may be forwarded separately from sequence 301A. The remaining sequences (e.g., sequences 301B-301X) may not include master manifest 310. Each sequence 301A through 301X may include an updated media manifest 311 and corresponding HLS media segments 312 for the low resolution variant (e.g., for cellular phone service), an updated media manifest 321 and corresponding HLS media segments 322 for the medium resolution variant (e.g., for computers with wifi access), and an updated media manifest 331 and corresponding HLS media segments 332 for the high resolution variant (e.g., for televisions). Each updated media manifest 311, 321, and 331 may include a text-based file that identifies the file names and sequencing of the corresponding segments. Thus, each sequence 301A through 301X of packets in multicast stream 210 may include a media manifest update and corresponding segments for each supported video resolution. Generally, HLS media manifests are updated at the rate of the media segment updates. In one example, updated media manifest 311, 321, and 331 may be generated every few seconds.

According to another implementation, multicast stream 210 may also include additional redundant packets to support forward error correction. Thus, for each packet shown in FIG. 3, multicast streamer 122 may also include one or more redundant packets to enable network devices (e.g., in hub VSO 114 or CDN 125) and user devices (e.g., in customer premises 115) to identify and correct errors without the need for retransmission via unicast.

Referring to FIG. 2C, repeater 130 within hub VSO 114 may receive multicast stream 210. Repeaters 130 may perform two primary tasks for multicast stream 210. In one of these two tasks, repeaters 130 propagate multicast stream 210 further downstream through access networks/PONs to user devices 140 at customer premises 115. Particularly, repeater 130 may receive multicast stream 210, provide a signal boost, and optionally retrieve/insert local or regional advertising files 212 from advertising streamer 134. Repeater 130 may forward the boosted multicast stream 214 via OLT 112 to ONT/BHR 142. ONT/BHR 142 may extract the appropriate bitrate variant from the boosted multicast stream 214 and provide media manifests and segments of the optimal bitrate variant 216 to user device 140 for presentation to a user. In one implementation, ONT/BHR 142 may communicate with user device 140 to determine an optimal bitrate variant to stream. In another implementation, user device 140 (e.g., a media playing client) may determine an optimal bitrate variant stream (e.g., based on a user device type and download bandwidth).

In the other of the two tasks, repeaters 130 join multicast stream 210 from the streamers 122, perform error/packet recovery, and push the verified HLS media manifests and segments 218 of multicast stream 210 to edge cache 132 via TCP. Error recovery may include, for example, initiating communication with streamer 122 (e.g., via TCP or another one-to-one protocol) to obtain a missing or corrupted packet from streamer 122 cache. Verified HLS media manifests and segments 218 that are pushed to edge cache 132 locations are made available for unicast delivery via TCP to mobile user devices 140 and are also utilized for non-linear services such as Look Back and Start Over features. In another implementation, unicast delivery of the verified HLS media manifests and segments 218 may be requested by user devices 140 to recover whole segments or manifests that may have been lost in multicast delivery. For example, user device 140 may be directed to edge cache 132 to retrieve stored segments 220 via unicast for previously-presented portions of program content requested by a user.

While FIGS. 2A-2C illustrate exemplary communications to deliver an HLS multicast service, according to other embodiments, network elements 110 of managed video access network 105 may perform additional, different, and/or fewer communications. Alternatively, new or modified messages and/or new or modified interfaces associated with the network elements may be implemented to accomplish similar tasks as described.

Figure 4:
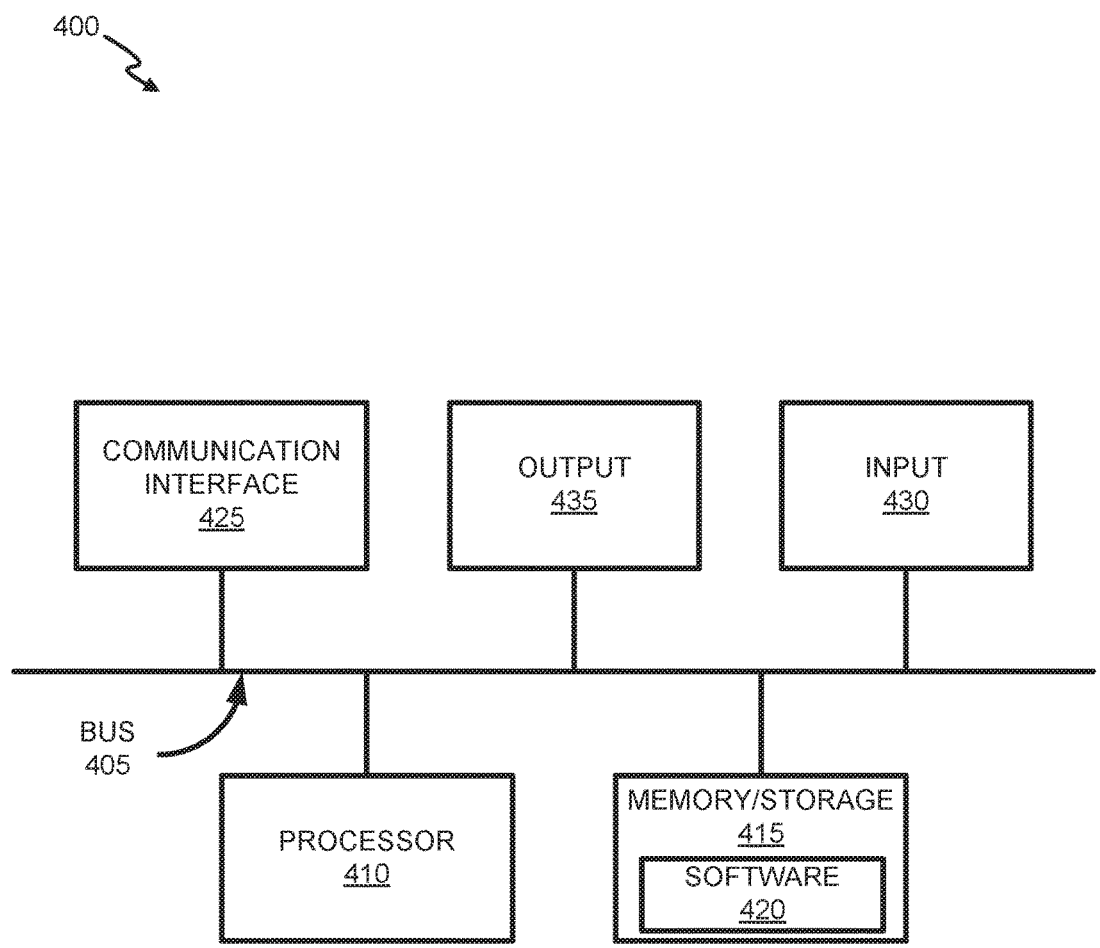
FIG. 4 is a diagram illustrating exemplary components of a device that may correspond to one or more of the devices in the exemplary environment.

FIG. 4 is a diagram illustrating exemplary components of a device 400 that may correspond to one or more of the devices described herein. For example, device 400 may correspond to components included in networks 105, network device 110, OLT 112, HLS encoder 120, multicast streamer 122, user device 140, ONT/BHR 142, and orchestrator 208. Additionally, the exemplary network elements (e.g., repeater 130, edge cache 132, ad streamer 134, etc.) may be implemented based on the components described. As illustrated in FIG. 4, according to an exemplary embodiment, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, and/or clocks.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc. Processor 410 may be a dedicated component or a non-dedicated component (e.g., a shared resource).

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include a drive for reading from and writing to the storage medium.

Memory/storage 415 may be external to and/or removable from device 400, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. Software 420 may include an operating system. Software 420 is also intended to include firmware, middleware, microcode, hardware description language (HDL), and/or other form of instruction. By way of example, with respect to network devices 110 and the other network elements, the logic that provides the HLS multicast service may be implemented to include software 420. Additionally, for example, user device 140 may include logic to perform tasks, as described herein, based on software 420.

Communication interface 425 permits device 400 to communicate with other devices, networks, systems, devices, and/or the like. Communication interface 425 includes one or multiple wireless interfaces and/or wired interfaces. For example, communication interface 425 may include one or multiple transmitters and receivers, or transceivers. Communication interface 425 may include an antenna. Communication interface 425 may operate according to a protocol stack and a communication standard. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 435 permits an output from device 400. For example, output 435 may include a speaker, a display, a light, an output port, and/or some other type of visual, auditory, tactile, etc., output component. According to some embodiments, input 430 and/or output 435 may be a device that is attachable to and removable from device 400.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
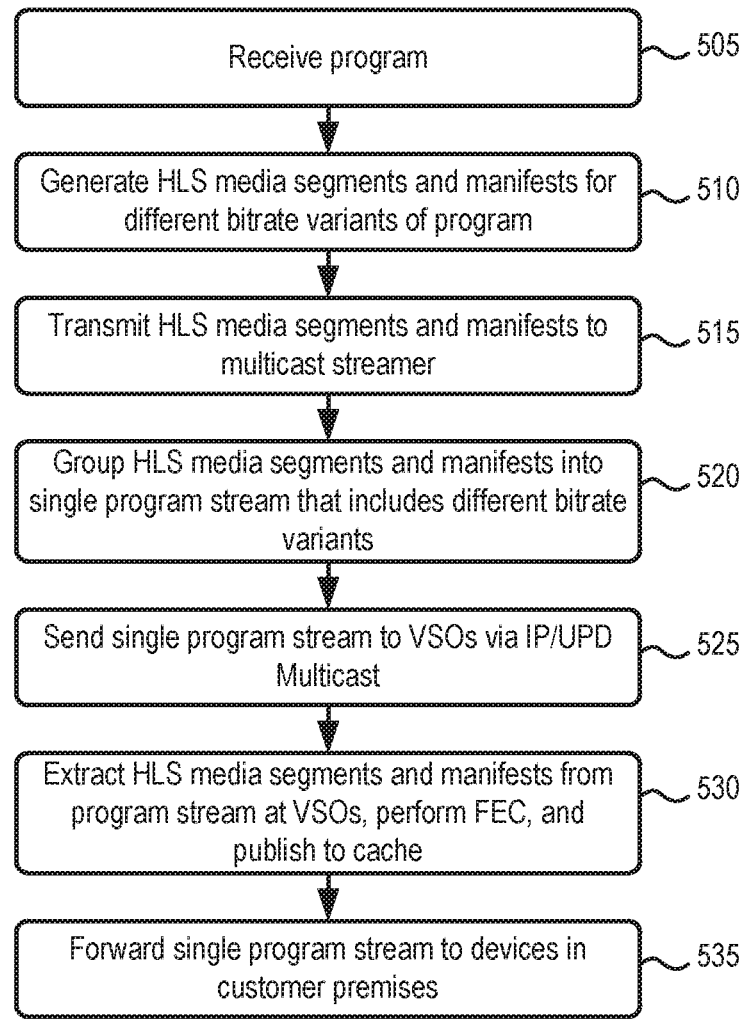
FIG. 5 is a flow diagram that illustrates an exemplary process for delivering a program via HLS multicast.

FIG. 5 is a flow diagram illustrating an exemplary process 500 for delivering a program via HLS multicast. In one implementation, process 500 may be implemented by devices in managed video access network 105. In another implementation, process 500 may be implemented by devices in managed video access network 105 in conjunction with one or more other devices in network environment 100, such as user devices 140 and/or ONT/BHRs 142.

Process 500 may include receiving a program (block 505) and generating HLS media segments and manifests for different bitrate variants of the program (block 510). For example, HLS encoder 120 may receive a live program (e.g., including audio and video data). HLS encoder 120 may generate, in response to receiving the program, an HLS master manifest file for the program (e.g., master manifest 310), multiple HLS media segments of the program with different bitrate variants (e.g., HLS segments 312, 322, 332), and an HLS media manifest file for each bitrate variant (e.g., media manifest updates 311, 321, 331).

Process 500 may further include transmitting the HLS media segments and manifests to a multicast streamer (block 515), grouping the HLS media segments and manifests into a single program stream that includes the different bitrate variants (block 520), and sending the single program stream to VSOs via IP/UDP multicast (block 525). For example, HLS encoder 120 may transmit the HLS master manifest file, the HLS media segments with different bitrate variants, and the HLS media manifest files for each bitrate variant to multicast streamer 122 via one or more TCP connections (e.g., unicast). Multicast streamer 122 may encapsulate the HLS master manifest file, the HLS media segments, the HLS media manifest files, into Internet IP/UDP packets for multicasting. Multicast streamer 122 may send the IP/UDP packets as a single program stream with the different bitrate variants to VSOs 114 via multicast (e.g., multicast stream 210).

Process 500 may also include extracting the HLS media segments and manifests from the program stream at VSOs, performing forward error correction (FEC), and publishing the HLS media segments and manifests to cache (block 530). For example, repeater 130 of VSO 114 may extract from the multicast IP/UDP packets, the HLS media segments (e.g., HLS segments 312, 322, 332) and the HLS media manifest files (e.g., media manifest updates 311, 321, 331) for each bitrate variant. Repeater 130 may perform forward error correction, if necessary, and send the HLS media segments and the HLS media manifest files to edge cache 132 (e.g., via a TCP connection). Forward error correction may include, for example, use of one or more algorithms verify redundant HLS multicast packets provided over multicast stream 210.

Process 500 may additionally include forwarding the single program stream to devices in customer premises (block 535). For example, VSO 114 (e.g., repeater 130) provides a signal boost, and optionally retrieves/inserts local or regional advertising files 212 from advertising streamer 134. Repeater 130 may forward the boosted IP/UDP packets (e.g., multicast stream 214) via OLT 112 to ONT/BHR 142.

Although FIG. 5 illustrates an exemplary HLS multicast streaming process 500, according to other embodiments, process 500 may include additional operations, fewer operations, and/or different operations than those illustrated in FIG. 5 and described herein.

Figure 6:
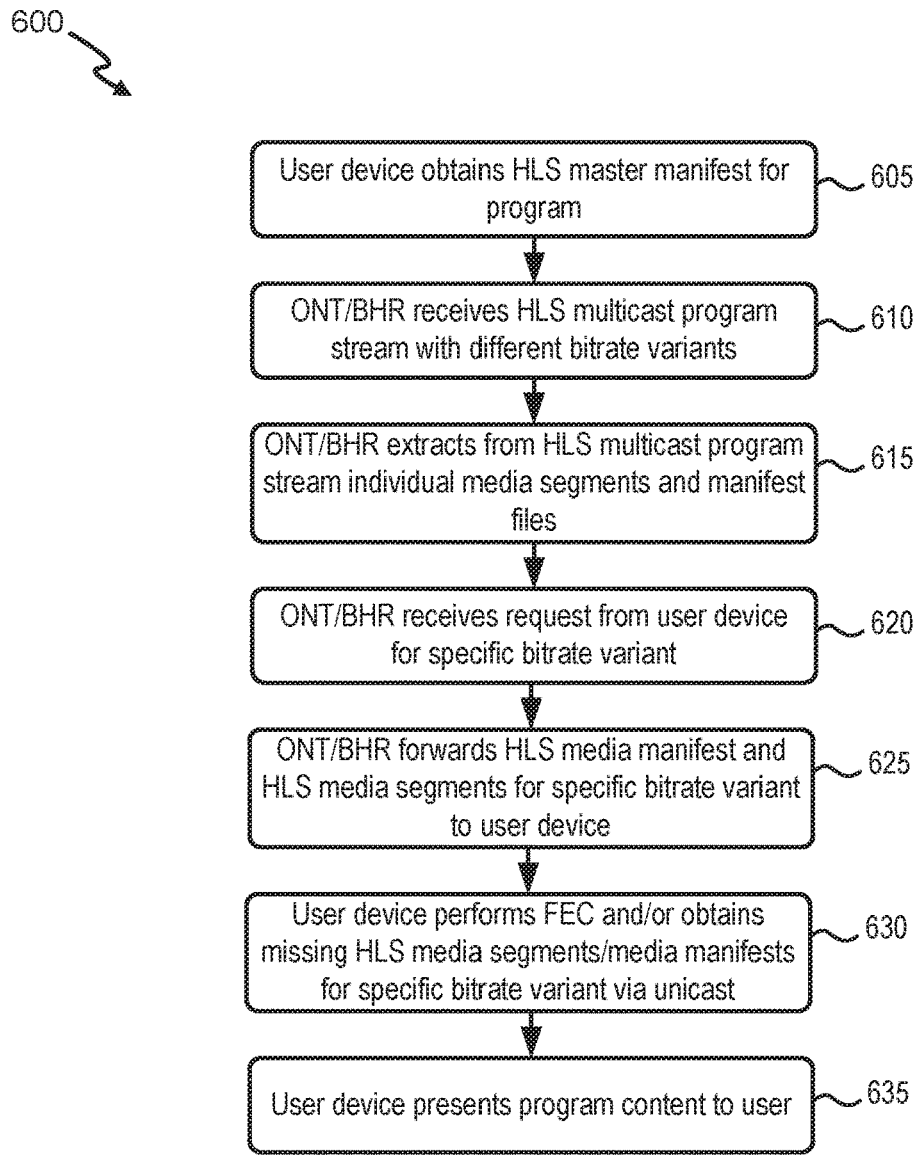
FIG. 6 is a flow diagram that illustrates another exemplary process for using an HLS multicast service.

FIG. 6 is a flow diagram illustrating an exemplary process 600 for using an HLS multicast service. In one implementation, process 600 may be implemented by user device 140 and ONT/BHR 142 at customer premises 115. In another implementation, process 600 may be implemented by devices in customer premises 115 in conjunction with one or more other devices in network environment 100, such as CDN repeater 124 or edge cache 132.

Referring to FIG. 6 process 600 may include a user device 140 obtaining an HLS master manifest for a program (block 605). For example, a user may use user device 140 to select a program from a menu/catalog of available programming. User device 140 may be directed to CDN 125 or VSO 114 to obtain an HLS master manifest (e.g., master manifest 310) for the program. According to one implementation, the HLS master manifest may be provided to user device 140 via TCP (e.g., HTTP unicast).

Process 600 may also include receiving the HLS multicast program stream with different bit rates (block 610) and extracting from the HLS multicast program stream individual media segments and manifest files (block 615). For example, ONT/BHR 142 may receive boosted multicast stream 214 from repeater 130 (e.g., via OLT 112). ONT/BHR 142 may extract the different bitrate variants and corresponding HLS manifest files from the boosted multicast stream 214.

Process 600 may further include receiving a request from a user device for a specific bitrate variant (block 620) and forwarding the HLS media manifest and HLS media segments for the specific bitrate variant to the user device (block 625). For example, using HLS master manifest 310, the media client on user device 140 may request one of the available bitrate variants for the selected program. ONT/BHR 142 may receive the request and begin to provide media manifests and segments of the selected bitrate variant (e.g., optimal bitrate variant 216) to user device 140 for presentation to the user.

Process 600 may additionally include performing forward error correction and/or obtaining missing HLS media manifest and HLS media segments for the specific bitrate variant via unicast (block 630) and presenting the program content to the user (block 635). For example, user device 140 may perform forward error correction using redundant segments provided in the selected bitrate variant. If an HLS media manifest update or media segment is missing (e.g., after FEC is performed), or if a user initiates a replay or trick play feature, user device 140 may obtain the necessary HLS media manifest updates or media segments from CDN repeater 124 or edge cache 132 via a TCP connection with unicast delivery. Similarly, if the media client (e.g., software 420) operating on user device 140 is not multicast capable, then user device 140 may obtain HLS media manifests and media segments for an optimal bitrate variant from edge cache 132.

Although FIG. 6 illustrates an exemplary process 600 for using an HLS multicast service, according to other embodiments, process 600 may include additional operations, fewer operations, and/or different operations than those illustrated in FIG. 6 and described herein.

The foregoing description of embodiments provides illustration, but is not intended to be exhaustive or to limit the embodiments to the precise form disclosed. Accordingly, modifications to the embodiments described herein may be possible. For example, according to other embodiments, the multicast HLS service may omit certain steps described herein.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 5 and 6, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 410, etc.), or a combination of hardware and software (e.g., software 420). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, a computer program, software, a software application, a data structure, a program module, an application, machine code, a file that can be executed using an interpreter, etc. The program code, instructions, application, etc., is readable and executable by a processor (e.g., processor 410) of a computational device. A non-transitory storage medium includes one or more of the storage mediums described in relation to memory/storage 415.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction described in the present application should be construed as critical or essential to the embodiments described herein unless explicitly described as such.

What is claimed is:

1. A system, comprising:
    a first network device in a multicast network, the first network device configured to:
        receive a program including audio and video data;
        generate:
            a Hypertext Transfer Protocol (HTTP) Live Streaming (HLS) master manifest file for the program,
            first HLS media segments of the program having a first bitrate,
            a first HLS media manifest file for the first HLS media segments,
            second HLS media segments of the program having a second bitrate, and
            a second HLS media manifest file for the second HLS media segments;
        transmit, to a second network device of the multicast network, the HLS master manifest file, the first HLS media segments, the first HLS media manifest file, the second HLS media segments, and the second HLS media manifest file;
    the second network device configured to:
        encapsulate the HLS master manifest file, the first HLS media segments, the first HLS media manifest file, the second HLS media segments, and the second HLS media manifest file into Internet Protocol/User Datagram Protocol (IP/UDP) packets;
        send the IP/UDP packets via multicast to one or more third network devices of the multicast network; and
    the one or more third network devices configured to:
        extract from the IP/UDP packets the HLS master manifest file, the first HLS media segments, the first HLS media manifest file, the second HLS media segments, and the second HLS media manifest file;
        send to a cache device, via a TCP connection, the HLS master manifest file, the first HLS media segments, the first HLS media manifest file, the second HLS media segments, and the second HLS media manifest file; and
        forward the IP/UDP packets via multicast to devices in customer premises.

2. The system of claim 1, wherein when sending the IP/UDP packets via multicast, the second network device is further configured to:
    send the IP/UDP packets to a repeater in a video serving office (VSO) and to another repeater in a content delivery network (CDN).

3. The system of claim 2, wherein the cache device is part of the VSO, and wherein the third network device is further configured to:
 store, the HLS master manifest file, the first HLS media segments, the first HLS media manifest file, the second HLS media segments, and the second HLS media manifest file at the cache device.

4. The system of claim 2, wherein the cache device is part of the CDN, and wherein the third network device is further configured to:
 store, the HLS master manifest file, the first HLS media segments, the first HLS media manifest file, the second HLS media segments, and the second HLS media manifest file at the cache device.

5. The system of claim 4, further comprising:
 a fourth network device in the CDN, the fourth network device configured to:
  store the HLS master manifest file;
  receive a request from a user device for the HLS master manifest file; and
  send, in response to the request, the HLS master manifest file via unicast delivery.

6. The system of claim 1, further comprising:
 an optical network terminal (ONT) at the customer premises, the ONT configured to:
  receive the IP/UDP packets;
  extract the first HLS media segments, the first HLS media manifest file, the second HLS media segments, and the second HLS media manifest file; and
  forward, to a user device, the combination of the first HLS media segments and the first HLS media manifest file or the combination of the second HLS media segments, and the second HLS media manifest file.

7. The system of claim 1, wherein the second network device is further configured to:
 store the IP/UDP packets for a designated Time-To-Live (TTL) period after sending the IP/UDP packets.

8. The system of claim 7, wherein when extracting, the third network device is further configured to:
 perform error recovery for the IP/UDP packets by initiating communication with the second network device.

9. A method comprising:
 receiving, by a first network device of a multicast network, a program including audio and video data;
 generating, by the first network device and in response to the receiving:
  a Hypertext Transfer Protocol (HTTP) Live Streaming (HLS) master manifest file for the program,
  first HLS media segments of the program having a first bitrate,
  a first HLS media manifest file for the first HLS media segments,
  second HLS media segments of the program having a second bitrate, and
  a second HLS media manifest file for the second HLS media segments;
 transmitting, by the first network device and to a second network device of the multicast network, the HLS master manifest file, the first HLS media segments, the first HLS media manifest file, the second HLS media segments, and the second HLS media manifest file in response to the generating;
 encapsulating, by the second network device, the HLS master manifest file, the first HLS media segments, the first HLS media manifest file, the second HLS media segments, and the second HLS media manifest file into Internet Protocol/User Datagram Protocol (IP/UDP) packets;
 sending, by the second network device, the IP/UDP packets via multicast to one or more third network devices of the multicast network;
 extracting from the IP/UDP packets, by one of the third network devices, the HLS master manifest file, the first HLS media segments, the first HLS media manifest file, the second HLS media segments, and the second HLS media manifest file;
 sending, by the one of the third network devices and via a TCP connection, the HLS master manifest file, the first HLS media segments, the first HLS media manifest file, the second HLS media segments, and the second HLS media manifest file to a cache device; and
 forwarding, by the third network device and via multicast, the IP/UDP packets to a device in a customer premises.

10. The method of claim 9, wherein sending the IP/UDP packets via multicast to the one or more third network devices further comprises:
 sending the IP/UDP packets to a repeater in a video serving office (VSO) and to another repeater in a content delivery network (CDN).

11. The method of claim 10, wherein the cache device is part of the VSO, the method further comprising:
 storing, the HLS master manifest file, the first HLS media segments, the first HLS media manifest file, the second HLS media segments, and the second HLS media manifest file at the cache device.

12. The method of claim 10, wherein the cache device is in the CDN, the method further comprising:
 storing, the HLS master manifest file, the first HLS media segments, the first HLS media manifest file, the second HLS media segments, and the second HLS media manifest file at the cache device.

13. The method of claim 9, further comprising:
 receiving, by the device in the customer premises, the IP/UDP packets;
 extracting, by the device in the customer premises, the first HLS media segments, the first HLS media manifest file, the second HLS media segments, and the second HLS media manifest file; and
 forwarding, by the device in the customer premises and to a user device, the combination of the first HLS media segments and the first HLS media manifest file or the combination of the second HLS media segments, and the second HLS media manifest file.

14. The method of claim 9, further comprising:
 receiving, at a video serving office (VSO) or a content delivery network (CDN), a request from a user device for the HLS master manifest file; and
 sending, in response to the request, the HLS master manifest file via unicast.

15. The method of claim 9, further comprising:
 storing, by the second network device, the IP/UDP packets for a designated Time-To-Live (TTL) period after sending the IP/UDP packets.

16. The method of claim 15, wherein the extracting further comprises:
 performing error recovery for the IP/UDP packets by initiating communication with the second network device.

17. One or more network devices, comprising:
 a communication interface;
 a memory, wherein the memory stores instructions; and a processor, wherein the processor executes the instructions to:
> receive one or more content streams for a program including:
> > a Hypertext Transfer Protocol (HTTP) Live Streaming (HLS) master manifest file for the program,
> > first HLS media segments of the program having a first bitrate,
> > a first HLS media manifest file for the first HLS media segments,
> > second HLS media segments of the program having a second bitrate, and
> > a second HLS media manifest file for the second HLS media segments;
>
> encapsulate the HLS master manifest file, the first HLS media segments, the HLS master manifest file, the first HLS media manifest file, the second HLS media segments, and the second HLS media manifest file into Internet Protocol/User Datagram Protocol (IP/UDP) packets; and
>
> send the IP/UDP packets via multicast to devices in customer premises.

18. The one or more network devices of claim 17, wherein when sending the IP/UDP packets via multicast, the processor further executes the instructions to:
> send the IP/UDP packets to a repeater in a video serving office (VSO) and to another repeater in a content delivery network (CDN).

19. The one or more network devices of claim 17, wherein the processor further executes the instructions to:
> store the IP/UDP packets for a designated Time-To-Live (TTL) period after sending the IP/UDP packets via multicast.

20. The one or more network devices of claim 17, wherein the one or more network devices comprise a first streaming device configured as an active device and a second streaming device configured as a backup device, and wherein both the active device and the backup device receive the one or more content streams for the program.

\* \* \* \* \*